Dec. 16, 1952  E. J. WELLS  2,621,452
SPINDLE
Filed Dec. 21, 1951  2 SHEETS—SHEET 1
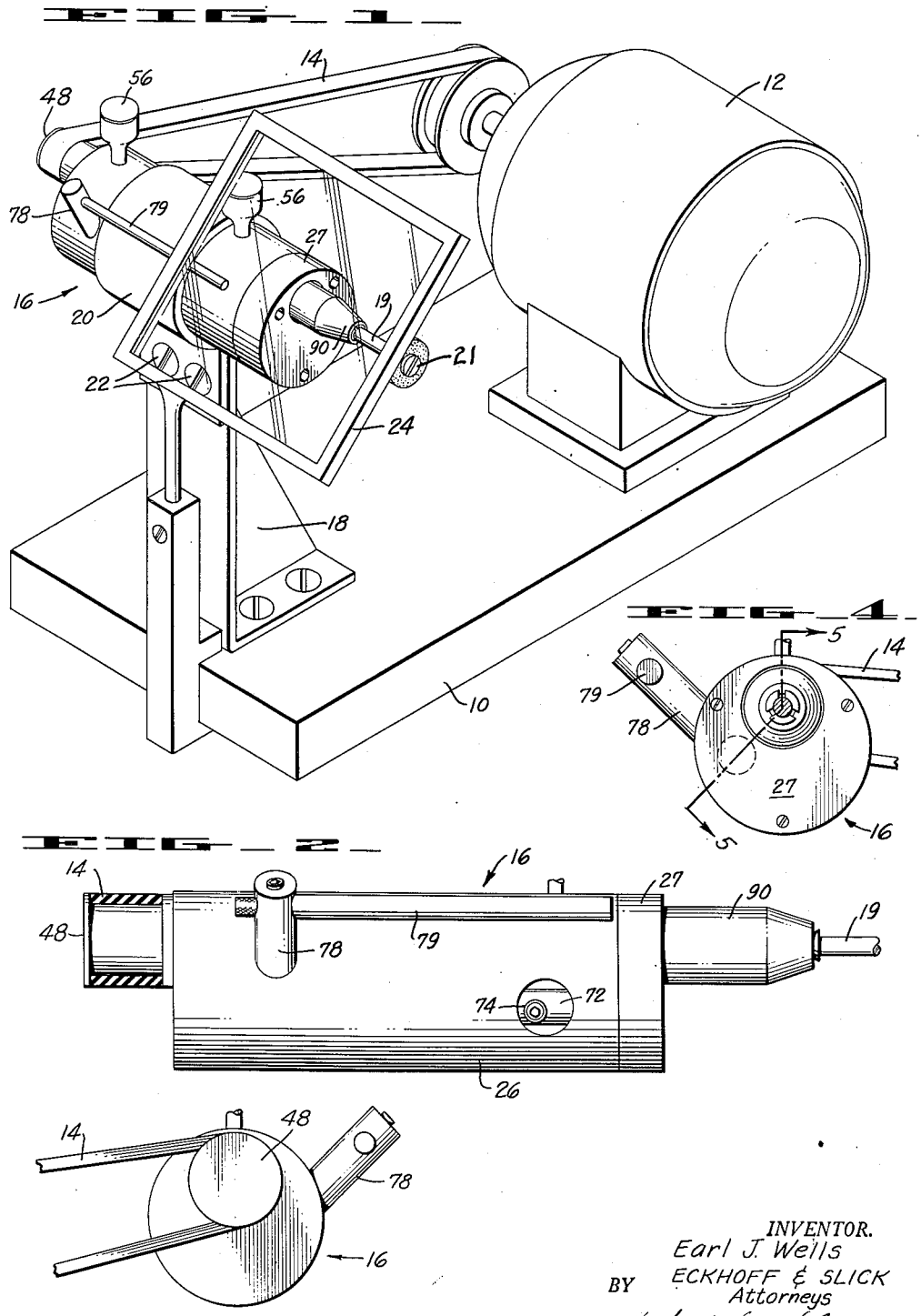
INVENTOR.
Earl J. Wells
BY ECKHOFF & SLICK
Attorneys
A member of the firm Dec. 16, 1952  E. J. WELLS  2,621,452
SPINDLE
Filed Dec. 21, 1951  2 SHEETS—SHEET 2
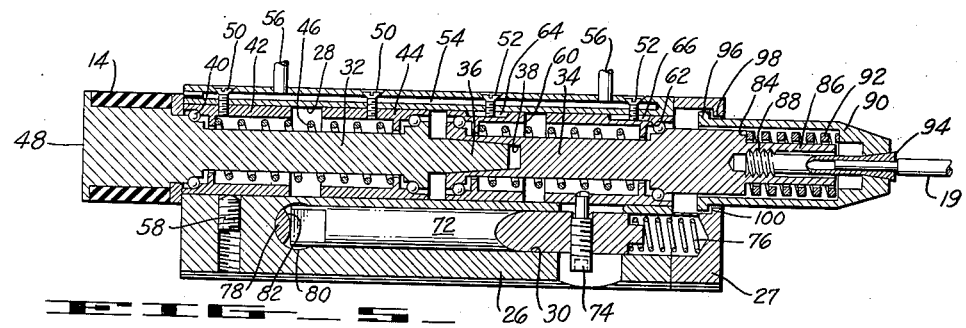
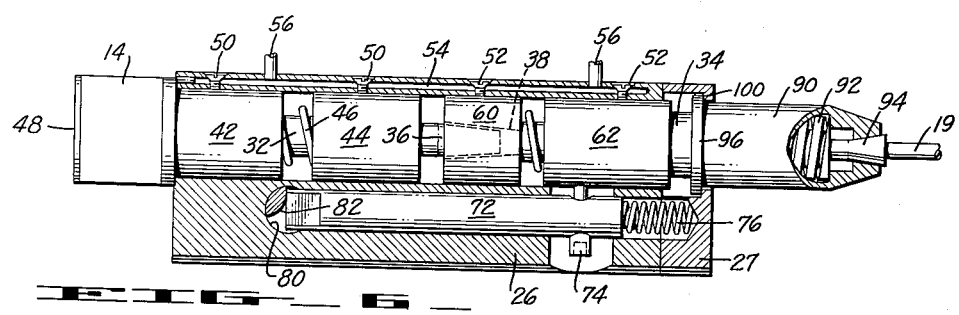
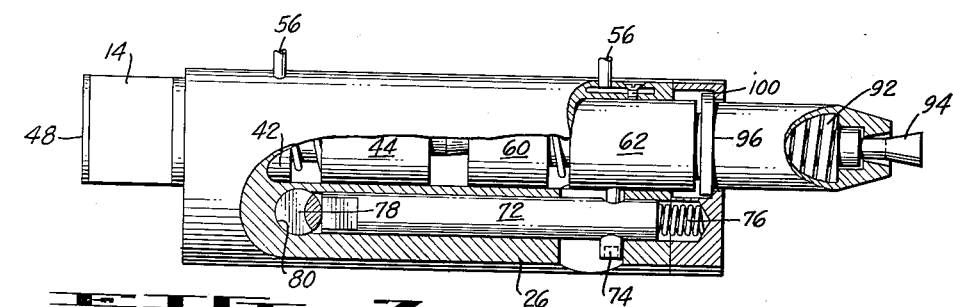
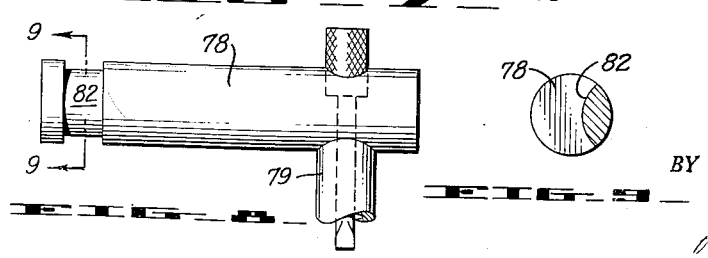
INVENTOR.
Earl J. Wells
BY ECKHOFF & SLICK
Attorneys
A member of the firm Patented Dec. 16, 1952

2,621,452

UNITED STATES PATENT OFFICE 2,621,452

SPINDLE

Earl J. Wells, Comptche, Calif.

Application December 21, 1951, Serial No. 262,867

4 Claims. (Cl. 51—166)

This invention relates to a chuck and spindle which is particularly adapted for use in holding rotary tools such as grinding or cutting wheels. Although the device can be made in various sizes to accommodate various tools, it is particularly adapted for use in conjunction with very small tools which are driven at high rates of speed, on the order of 20,000 R. P. M., such as small grinders.

It is the object of the present invention to provide a spindle and chuck structure of generally improved design which is capable of operating at high speeds.

Another object of this invention is to provide a spindle which can be controlled with a single lever whereby the spindle can be stopped without stopping the driving motor, can be braked rapidly to a stop, can be locked so that the cutting tool is held firmly in place, and can be unlocked to free the tool holding chuck or collet.

Another object of this invention is to provide a spindle with a simple means of adjusting the tension on the driving belt.

Since spindles frequently operate at high rates of speed, it would be very time-consuming if the motor had to be stopped each time one wished to change the cutting wheel. Further, such cutting wheels are frequently held in place by a small screw on the end of the shaft which may become loosened. When using my device, it is not necessary to remove the tool from the chuck to tighten the screw holding the cutting wheel to its shaft, but the spindle and shaft can be locked, enabling one to perform the tightening operation while the shaft is in place in the chuck.

The invention includes other objects and features of advantage, some of which, together with the foregoing, will appear hereinafter wherein the present preferred form of chuck and spindle construction embodying the present invention is disclosed.

In the drawings accompanying this application,

Figure 1 is a perspective view of my improved spindle and chuck as it is normally mounted on a support.

Figure 2 is a front elevation of my improved spindle.

Figure 3 is a side elevation from the pulley end of my improved spindle and Figure 4 is a side view of my improved spindle from the chuck end.

Figure 5 is a cross sectional view on the lines 5—5 of Figure 4 showing the internal mechanism which is employed.

Figure 6 is a schematic view, partially in section, showing the position which the parts assume when the spindle is in the locked position.

Figure 7 is a similar view showing the position which the parts assume when the chuck is in a locked position and when the collet is loosened.

Figure 8 is a view of the lever used to shift the spindle and Figure 9 is a cross section thereof on the line 9—9' of Figure 8.

Referring now to the drawings by reference numerals, there is shown a base 10 and a motor 12 having a driving belt 14 thereon. The spindle which forms the present invention has been generally indicated at 16. The spindle is held in place on the base 10 by means of a support 18 and the spindle is prevented from rotation by a clamp 20 held by screws 22 on the support 18. As is apparent from Figure 1, the shaft of the spindle is off center from the body of the spindle housing and if one desires to adjust the belt tension, it is only necessary to loosen the screws 22 and rotate the housing slightly. In addition, such structures ordinarily provide an eye shield 24 to protect the user from small fragments thrown from the cutting wheel.

The spindle proper includes a housing 26 of generally cylindrical form and made from steel or other suitable metal. There are two cylindrical bores parallel to the axis of the housing 26, a large bore 28 which accommodates the shaft and associated equipment, and a smaller bore 30 adapted to receive the shifting rod. The spindle proper consists of a shaft 32 and a second shaft 34, shaft 32 having at the end thereof a conical extension 36 and shaft 34 having at the matching end a tapered hole 38. The conical member 36 is adapted to fit in the hole 38 and when the two are placed together, motion from the shaft 32 will be communicated to the shaft 34 and when the two shafts are separated slightly, motion will no longer be communicated between the two, constituting a clutch. The shaft 32 is suspended by means of ball bearings 40 from two subhousings, designated 42 and 44. The subhousings 42 and 44 are held apart by a spring 46, and the limit of their travel is determined by the ball bearings 40 and the races provided on shaft 32. The subhousings 42 and 44 are held loosely in place by means of screws 50 and 52. There is a slight clearance between the subhousings and the screws so that the subhousings are held in approximately the correct position by means of the screws, but are not held firmly thereby. Thus, the subhousings float between the two ball races and accurate alignment is obtained. To provide oil on the bearings, a small hole 54 leads from the oil holder 56 to the vicinity of the two screws 50 and 52. Since these screws do not fit tightly in place, it is apparent that oil can drip past them into the inner part of the housing and lubricate the internal mechanism. The subhousing 42 must be clamped in place, as will be later apparent, and a convenient means for doing this is a set screw 58. The end of shaft 32 which protrudes from the housing forms a pulley 48 which may be driven by means of the belt 14.

As can be seen from the drawing, the shaft 34 is suspended from subhousings 60—62 and ball bearings in the same manner as shaft 32. The subhousings 60 and 62 have key-ways 64 and 66 cut therein so that the screws 52 prevent these subhousings from rotating, but allow the subhousings to move in a direction parallel to the axis of the spindle.

In order to move the assembly provided by the subhousings 60 and 62, shaft 34 and the associated equipment, a shifting rod 72 is provided which moves in the hole 30. The rod 72 is connected to the subhousing 62 by means of a screw 74 so that movement of lever 72 controls the movement of subhousing 62. A spring 76 is provided which is loaded in compression so that the lever 72 is ordinarily biased by the spring to the left (as shown in Figure 5). It is apparent from this that if the lever 72 is not acted upon by any external force, it will urge the shaft 34 into engagement with the shaft 32, and thus engage the clutch so that the two shafts will revolve as one. In order to move rod 72, a lever 78 is provided. The lever 78 fits into a hole 80 which extends at right angles to the axis of the housing 26. The lever 78 has a cam surface therein, 82, so that rotation of the lever will move rod 72 from its normally biased position to the right. Lever 78 is equipped with an arm 79 so that it can be readily turned.

As is shown in the drawings, shaft 34 protrudes from the housing and is provided with a shoulder 84 and a hollow end 86 having a threaded portion 88. A chuck 90 fits over the end of shaft 34, and is held in an extended position by a stiff spring 92. A collet 94 is screwed into the threaded portion 88 so that the chuck 90 is restrained in movement in one direction by the stiff spring 92 and is restrained from movement in the other direction by the collet 94, as well as by the shoulder 96 of the chuck.

A cap-like member 27 is provided on the end of the housing 26 which has an aperture 98 which is of sufficient size to accommodate the main body of the chuck 90. The cap 27 has an abutment 100 which serves to engage, in some positions, the collar 96 on the chuck.

It is apparent from the above that the shaft 32 is turned by the motor and stays in the same relative position to the body of the chuck at all times. The shaft 34 may be moved back and forth due to the fact that it is not held in place in a positive manner, but may slide within the housing as the result of the sliding engagement between the screws 52 and the key-ways 64 and 66. Of course, there is no substantial relative movement between the subhousings 60 and 62 and the shaft 34 and the whole sub-assembly moves back and forth as a unit.

When no force is exerted by the cam 82 on the rod 72, the light spring 76 tends to keep the shaft 34 in the position shown in Figure 5 wherein the clutch is engaged and the shaft 19 is held firmly by the collet in the chuck. When the arm 78 is turned slightly, the cam 82 pushes the rod 72 to the right, which in turn moves subhousings 60 and 62 to the right, disengaging the clutch. As the cam 82 is turned further, the collar on the chuck 96 engages the abutment 100, acting as an effective brake for the chuck and bringing it to a rapid stop. In this position, the chuck is held firmly and the work piece 19 is also held firmly by the collet.

Thus, when the lever 78 is in this position, one may make any adjustment required, such as tightening the screw 21 as the shaft 19 is held firmly in place. This position of the parts is clearly shown in Figure 6.

As the cam 82 is moved still further, the shaft 34 is moved further to the right and, since the chuck 90 can move no further to the right, this results in a compression of the stiff spring 92 which in turn loosens the collet from engagement with the jaws of the chuck, permitting one to withdraw the shaft 19 from the collet and to replace it with a shaft of similar size, or to remove the collet altogether for replacement. It will be noted that the forces acting on the cam 82 when the levers in this position are balanced, so that there is no tendency for the arm 78 to rotate. Thus, with the spindle locked in this position, it is not necessary to maintain any pressure on the arm 79 connected to the lever 78. This position of the parts is clearly shown in Figure 7.

The chuck of the present invention enables one to have a grinding wheel or similar cutting tool operating at a high rate of speed, such as 20,000 R. P. M., to stop the wheel without stopping the driving motor, replace or adjust the cutting tool and then bring the cutting wheel up to speed, all in a matter of a few seconds.

I claim:

1. A spindle holder comprising a cylindrical housing having a longitudinal eccentric bore therein, a driving shaft rotatably mounted in part of said bore and a driven shaft rotatably mounted in the remainder of said bore, a clutch between the two shafts, means for moving the driven shaft in said bore to engage and disengage the clutch and a chuck carried by said driven shaft having a collar thereon, a shoulder on said cylindrical housing adapted to engage said collar and a collet mounted on said driven shaft normally held in a closed position by said chuck and adapted to be released by relative movement of the driven shaft and the chuck, said movement being accomplished by pressure on said collar from said shoulder.

2. A spindle holder comprising a cylindrical housing, having a longitudinal eccentric bore therein and a driving shaft and a driven shaft rotatably mounted in said bore, a clutch between the two shafts, said driving shaft being restrained against axial movement and said driven shaft having restricted axial movement, a chuck having a collar thereon mounted on said driven shaft, a collet threadably mounted on said driven shaft and held in a normally closed position by the chuck, an abutment on said housing adapted to engage the collar of the chuck and cause relative movement between the chuck and the shaft, shifting means for axially moving the driving shaft comprising a rod adapted for movement in a second longitudinal offset bore in the housing, interconnecting means between the rod and the driven shaft and a spring tending to normally bias the driven shaft into engagement with the driving shaft.

3. The spindle holder of claim 2 wherein the movement of the rod is controlled by a cam.

4. A spindle holder comprising a cylindrical housing having a longitudinal eccentric bore therein and a driving shaft and a driven shaft rotatably mounted in said bore, a clutch between the two shafts, said driving shaft being restrained against axial movement, a chuck having a collar thereon mounted on said driven shaft, a collet threadably mounted on said driven shaft and held in a normally closed position by the chuck, an abutment on said housing adapted to engage the collar of the chuck and cause relative movement between the chuck and the shaft, said clutch being engaged when the shafts are in contact and disengaged when said shafts are out of contact, said collar contacting said abutment and acting as a brake as the shafts are moved further from engagement and said abutment pressing the collar of the chuck and opening the collet as the shafts are further separated.

EARL J. WELLS.

REFERENCES CITED

The following references are of record in the file of this patent:

UNITED STATES PATENTS

| Number | Name | Date |
|---|---|---|
| 306,560 | Van De Water | Oct. 14, 1884 |
| 1,370,964 | Hansen | Mar. 8, 1921 |
| 1,500,122 | Fowler | July 8, 1924 |
| 2,420,836 | Nelson, Jr. | May 20, 1947 |
| 2,483,590 | Mitchell | Oct. 4, 1949 |
| 2,505,958 | Grierson | May 2, 1950 |

FOREIGN PATENTS

| Number | Country | Date |
|---|---|---|
| 395,886 | Germany | May 23, 1924 |